(12) United States Patent
Creswell et al.

(10) Patent No.: US 7,916,847 B2
(45) Date of Patent: *Mar. 29, 2011

(54) CONSOLIDATED ACCESS AND ADMINISTRATION OF CUSTOMIZED TELEPHONE CALLING SERVICES

(75) Inventors: Carroll W. Creswell, Basking Ridge, NJ (US); Kenneth H. Rosen, Middletown, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/214,287

(22) Filed: Jun. 18, 2008

(65) Prior Publication Data

US 2008/0260130 A1 Oct. 23, 2008

Related U.S. Application Data

(63) Continuation of application No. 09/996,645, filed on Nov. 28, 2001, now Pat. No. 7,801,290.

(51) Int. Cl.
*H04M 3/42* (2006.01)
*H04M 3/436* (2006.01)
*H04M 3/54* (2006.01)

(52) U.S. Cl. ......... 379/201.02; 379/201.05; 379/201.12; 379/207.02; 379/210.02; 379/211.02

(58) Field of Classification Search . 379/201.01–201.05, 201.12, 207.02, 207.11, 207.13, 207.16, 379/210.02, 211.02
See application file for complete search history.

(56) References Cited

U.S. PATENT DOCUMENTS

| | | | | | |
|---|---|---|---|---|---|
| 4,887,294 | A | * | 12/1989 | Ruey-Guang | 379/355.01 |
| 5,436,957 | A | * | 7/1995 | McConnell | 379/88.23 |
| 5,533,100 | A | * | 7/1996 | Bass et al. | 379/88.06 |
| 5,696,809 | A | * | 12/1997 | Voit | 379/22.01 |
| 5,706,336 | A | * | 1/1998 | Kikinis | 379/93.01 |
| 5,835,573 | A | * | 11/1998 | Dee et al. | 379/88.26 |
| 7,801,290 | B1 | * | 9/2010 | Creswell et al. | 379/201.02 |

* cited by examiner

*Primary Examiner* — Harry S Hong

(57) ABSTRACT

The present invention provides methods that allow more sophisticated use of custom calling services by consolidating the access to and administration of services for multiple lines and/or telephone devices. Embodiments include a single configuration interface for the calling services on all of an individual's telephone lines or devices, a single system for providing incoming calling services for all of an individual's telephone lines or devices, and a single system for providing outgoing calling services for all of an individual's telephone lines or devices. The present invention also includes features which allow custom calling services for a particular telephone device to be customized so as to interact with the custom calling services on another telephone device belonging to the same user.

19 Claims, 3 Drawing Sheets

CONSOLIDATED ACCESS AND ADMINISTRATION OF CUSTOMIZED TELEPHONE CALLING SERVICES

CROSS REFERENCE TO RELATED APPLICATIONS

This application is a continuation of application Ser. No. 09/996,645, filed Nov. 28, 2001 now U.S. Pat. No. 7,801,290.

TECHNICAL FIELD

The present invention relates to telephone communications. More particularly, the present invention is directed to methods for consolidating access and administration of telephone calling services for multiple lines and/or devices.

BACKGROUND OF THE INVENTION

Recent years have seen a dramatic increase in the number of telephone lines and telephone "devices" (e.g., mobile phones, IP telephony software) belonging to or used by each individual. This increase is due to a variety of factors but the result has been that many individuals are nearly overwhelmed by the effort required to manage the incoming and outgoing calls on these multiple telephone lines.

In an effort to assist individuals in this management task, the number and variety of enhanced telephone services offered to ordinary customers, such as call forwarding, repeat dial, call blocking, caller ID, and distinctive ring, has increased dramatically. Services previously only available to businesses employing a private branch exchange (PBX) have become widely available as enhancements furnished by local exchange carriers (LEC) for a small fee. LECs provide these features within the Public Switched Telephone Network (PSTN) through the use of intelligent switches that provide services to customers on the basis of requests that are transmitted as dual tone multi frequency (DTMF) tones for special numbers (e.g., *69).

Although they are commonly referred to as Custom Calling Services (CCS) or Customized Local Area Signaling Services (CLASS), the services as presently offered are generally not as useful as they could be due to the difficulty in coordinating these features across multiple lines and/or devices (e.g., home phone, mobile phone, pager, business phone, etc), and the resulting limited customization options. For example, Verizon offers a repeat dial service that will dial a busy number until the call goes through and then the original caller is rung back, or until 30 minutes have elapsed. The service can be canceled manually, but there is no way to program the service to attempt the call for any shorter or longer amount of time. Furthermore, even though the repeat dial service is not implemented on the customer's telephone unit but rather is accomplished at a switch or other network entity within the PSTN, the service always calls back to the number from which the original call was made. If a subscriber to the service knows that he or she will only be at a particular number for ten minutes, it would be convenient to have repeat dial only attempt to complete the call for the next ten minutes, or, alternatively, to ring the original caller back at a different number when the call is completed. In another example, a telephone customer may initiate call forwarding with the intention that his or her calls be forwarded to another location when the telephone is unattended and then forget to turn off call forwarding when they return. It would be useful to be able to program the call forwarding service to only be operable for a limited time or to automatically forward the call to all of the customer's phone numbers.

It would be useful to provide greater coordination between custom calling services on multiple lines and greater customization options that take advantage of the multiple lines or devices belonging to a customer.

SUMMARY OF THE INVENTION

The present invention provides methods that allow more sophisticated use of custom calling services by consolidating the access to and administration of services for multiple lines and/or telephone devices.

In one embodiment of the present invention, configuration of calling services for a number of telephone devices belonging to a single subscriber is provided by receiving a request from the subscriber to configure the calling services, determining the individual configuration changes that are required to fulfill the subscriber's request, and distributing the individual configuration changes for each telephone device to the network entity that provides the calling service for that telephone device.

In another embodiment, customized calling services are provided for incoming calls by determining the telephone device to which the call is directed, determining to which subscriber that telephone device belongs, retrieving calling service configuration information for a number of telephone devices belonging to the subscriber, and determining where to direct the incoming call based on calling service configuration information for a different telephone device.

In another embodiment, customized calling services are provided for outgoing calls by identifying the subscriber who is placing the call, retrieving calling service configuration information for a number of telephone devices associated with the subscriber, and providing customized calling services based on configuration information for a telephone device other than the telephone device from which the subscriber is placing the current call.

DETAILED DESCRIPTION

Figure 1:
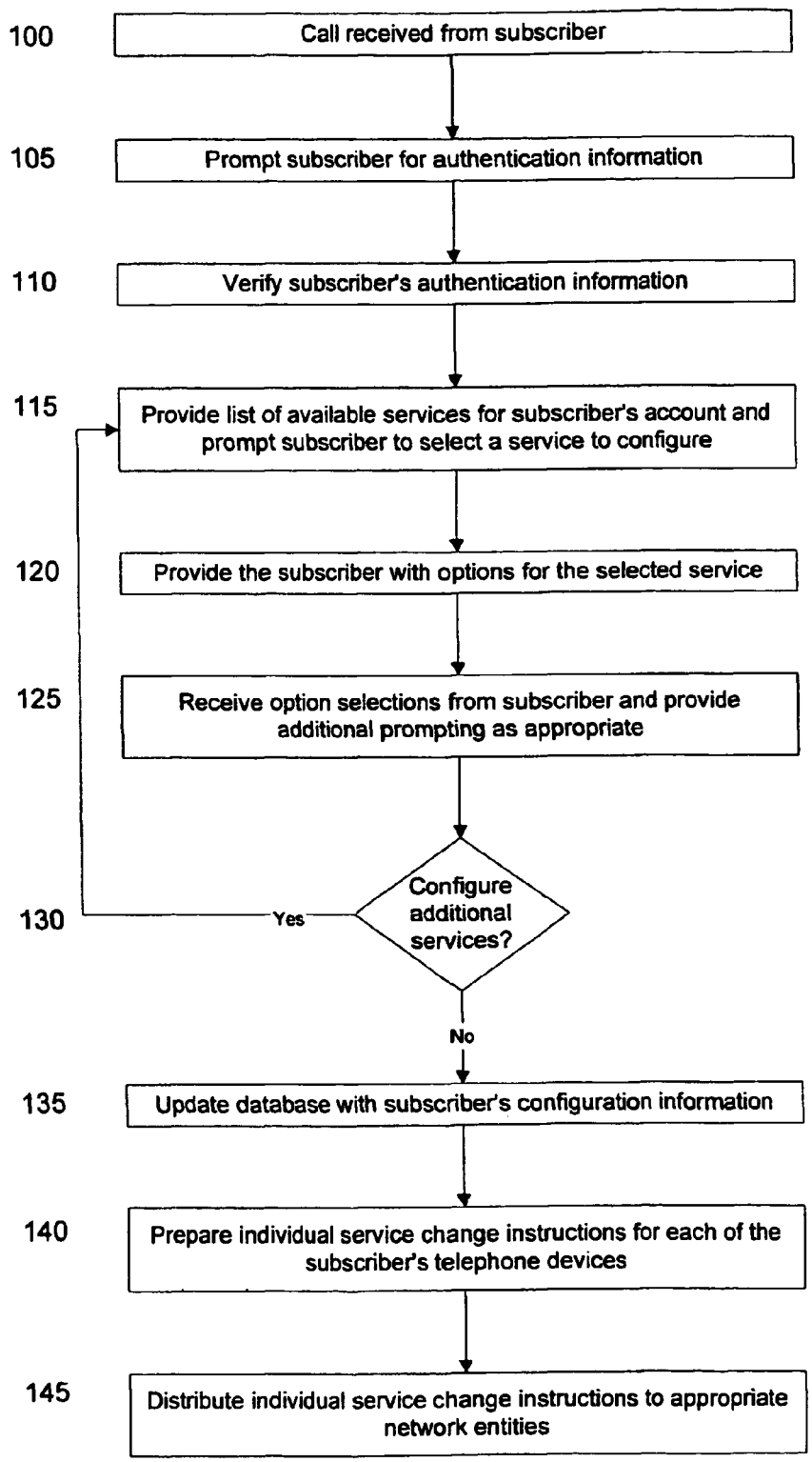
FIG. 1 is a flow chart illustrating one possible embodiment of the present invention for configuring calling services for multiple telephone devices.

This application describes methods to enhance the customization of a variety of calling services by consolidating administration of these services and allowing the services to be coordinated over multiple telephone lines and/or devices. Some of these calling services will be described briefly in the following paragraphs but those of skill in the art will realize that the principles of the present invention may be applied to variations of the described calling services as well as to calling services that are not explicitly included in these descriptions.

Repeat dial is a service that, when a subscriber encounters a busy signal when placing a call, automatically continues dialing until the number is free and then calls back the original caller. If after some predetermined time period the number is still busy, the repeat dial service ceases automatically dialing. The time period for dialing and the frequency of attempts is generally set by the service provider.

Call forwarding is a service that intercepts calls intended for the subscriber's telephone number and redirects them to a number of the subscriber's choosing. The subscriber can activate and deactivate this service as desired and can designate the number to which calls are forwarded when the service is activated. Some implementations of this service require that the activation and deactivation be done from the subscribing number, but other implementations allow it to be performed from anywhere. Enhanced implementations of this feature only forward calls from a list of numbers that has been specified by the subscriber.

Incoming call blocking is a service by which incoming calls from certain numbers to the subscriber's number are intercepted and receive either a busy signal or recorded message. The numbers to be blocked are specified by the subscriber and the service can be activated or deactivated by the subscriber as desired.

Outgoing call blocking is a service by which the subscriber can prevent some or all calls from being placed via the subscribing telephone. The subscriber can choose to block outgoing calls based on number, area code, type of call (e.g., international), or limit outgoing calls to certain numbers, area codes, or types of calls.

Priority ringing is a service that allows a subscriber to specify certain numbers so that when an incoming call is from one of those numbers the phone rings with a distinctive ring. The subscriber can activate and deactivate the service as desired and specifies the list of numbers when the service is activated.

Return call (frequently referred to as *69) is a service that allows a subscriber to determine the originating number of the last incoming call to the subscribed number and optionally to return the call.

The aforementioned calling services can be generally divided into two categories, incoming call services (e.g., call forwarding) and outgoing call services (e.g., repeat dial). Embodiments of the present invention can administer one or both of these categories of calling services for multiple lines or devices.

In one embodiment of the present invention, both incoming and outgoing calling services are administered for multiple lines and devices through a configuration interface. This configuration interface may be a interactive voice response (IVR) system or DTMF response system that is accessed through the telephone.

An example of a method of configuring calling services for multiple telephone devices via an IVR system is shown in FIG. 1. The process is initiated when the subscriber calls the system (Step 100). The system audibly prompts the subscriber to identify what account he/she is calling about and authenticate that he/she is authorized to modify the configuration settings for that account (Step 105). If the subscriber returns a valid account identifier (e.g., a username, an account number, a telephone number of one of the lines in the account) and the corresponding authentication information (Step 110), the configuration system provides the subscriber with a list of all of the services that are subscribed to for that account and prompts the subscriber to select which service he/she wishes to configure (Step 115). After the subscriber selects a service, the system then provides the various options that can be used to configure that service (Step 120). For example, if the service selected is repeat dial, the system may provide options for length of time to redial, time between redial attempts, total number of redials, ringback numbers other than the original calling number, and a priority list for the order to try the ringback numbers. In another example, if the service selected is call forwarding, the system may provide options for scheduling when to activate and deactivate forwarding, selecting which numbers are to be forwarded to a particular number, and scheduling different numbers to be forwarded to at different times. The subscriber then selects options to be configured for the selected service and the IVR system provides the appropriate prompting depending on the options selected (Step 125). When the subscriber has finished configuring the selected service, the system returns the subscriber to the list of services and the subscriber can select additional services to configure or exit the system (Step 130).

Once the subscriber has finished configuring the calling services, the system updates a database that stores all of a subscriber's configuration information (Step 135). In addition to the calling service configuration options that the subscriber has entered via the configuration interface, this information can include a listing of all of the telephone lines or devices that belong to the subscriber that are to be controlled by the system, along with data on how to contact the entity responsible for each so that the configuration information can be properly distributed. For example, the calling services on the subscriber's home phone would be likely be handled by the local switch, so in the database the system would have a network address or similar information for this switch associated with the subscriber's home phone number. The calling services for the subscriber's mobile phone are likely handled by a different switch, and that switch's address information would be associated with the mobile phone number. This contact information may also include data on how to distribute the configuration data to another carrier if the subscriber does not have all of his/her telephone service through a single provider (e.g., a subscriber's home phone, mobile phone, and IP telephony service could be provided by a LEC, a nationwide cellular provider, and an internet service provider, respectively). For example, the system could actually call the other carrier's switch and use the same DTMF tones used by a normal caller to change the calling service configuration (e.g., *60 followed by the telephone number to be blocked).

Based on the calling service configuration information in the database, the system then prepares individual service change instructions for each of the telephone lines and devices belonging to the subscriber (Step 140). These service changes are then distributed to the appropriate entities using the contact information in the database (Step 145).

Figure 2:
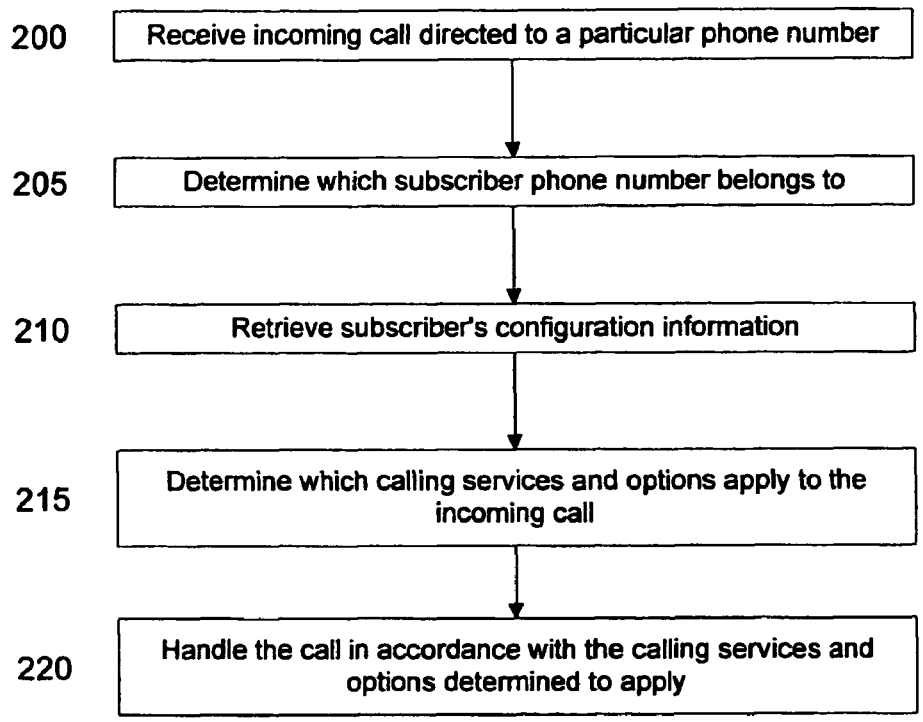
FIG. 2 is a flow chart illustrating one possible embodiment of the present invention for providing customized incoming calling services for multiple telephone devices.

Alternatively, a subscriber may have all of his phone services through a single carrier in which case all of the subscriber's calls (home, mobile, IP telephony, etc) could be routed through a single "master switch", thus eliminating the need to transmit service change instructions to other systems. In this embodiment, as shown in FIG. 2, the master switch receives an incoming call to a particular telephone number (Step 200). The master switch compares the telephone number to the information in the configuration database to determine to which subscriber this number belongs (Step 205). The master switch then retrieves that subscriber's configuration information from the database (Step 210), determines what calling services and options apply to this call (Step 215), and handles the call appropriately (Step 220).

Embodiments of the present invention may also include an option to allow the user to review the selected configuration for each subscribed service or all the services. Under this option, the system will audibly recite all of the configuration settings for each service. Additionally, the system may recite any scheduling settings for services either on a service by service basis or in chronological order.

Another option that may be included is to check that there are no logical inconsistencies in the configuration. For example, the subscriber would be notified if the call forwarding option is set to forward incoming calls to itself resulting in an endless loop (i.e., the number to forward to is the number from which calls are being forwarded), or the call forwarding option on several telephone devices may be set such that an endless cycle of involving two or more devices forwarding calls among themselves may result. In another example, the length of time to redial for repeat dial may exceed the amount of time between redial attempts (i.e., redial for 10 minutes and wait 22 minutes between attempts) resulting in no redial operation actually occurring.

A feature may also be included to allow the subscriber to use return call from one telephone (e.g., a mobile phone) and retrieve the phone number of the last call to a different phone (e.g., the subscriber's home phone).

An alternative embodiment for configuring the incoming and outgoing calling services is a visual computer interface accessed via, for example, the Internet and programmed in HTML. This embodiment is especially appropriate when one or more of the subscriber's devices is an IP telephony or one packet-based system. This embodiment will also allow for visual confirmation of the subscriber's selections as well as more rapid use because the subscriber will not have to listen while an IVR system recites menu choices.

Figure 3:
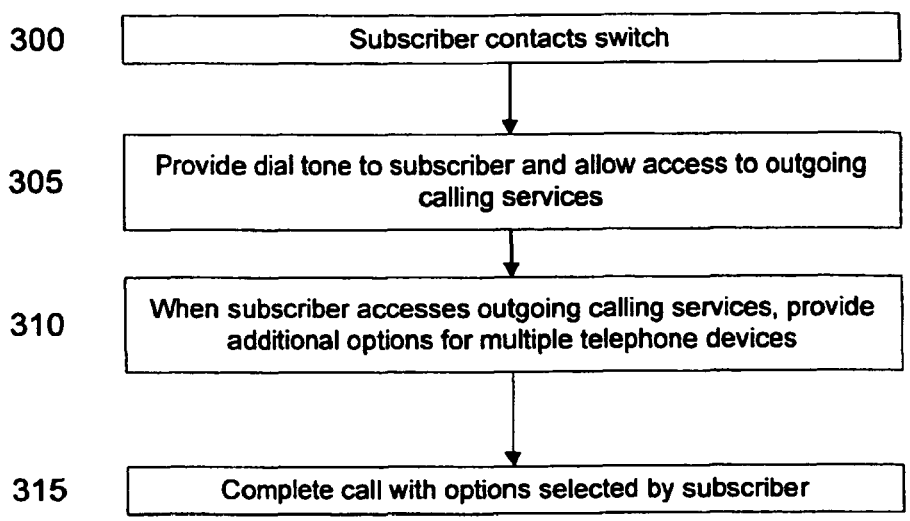
FIG. 3 is a flow chart illustrating one possible embodiment of the present invention for providing customized outgoing calling services for multiple telephone devices.

In another embodiment of the present invention, as shown in FIG. 3, the subscriber may interact with an intelligent switch or similar network element in the PSTN to use outgoing call services. This switch may also optionally function as a "master switch" for the subscriber's incoming calls. First, the subscriber contacts the switch (Step 300). For example, the subscriber's home phone or mobile phone may connect to the switch by default when the receiver is picked up. Alternatively, this can be accomplished by dialing a particular number (e.g., 1-800-CALL-ATT) which allows the subscriber to use the customized services even when calling from a phone that does not belong to the subscriber. This method of accessing the switch may optionally include an authentication procedure (e.g., requesting the subscriber's calling card number and PIN) to be completed by the subscriber to prevent theft of services. Once connected, the subscriber receives a standard dial tone and can access outgoing calling services in the standard fashion (e.g., dialing *66 for repeat dial) (Step 305). However, when the subscriber accesses these services, additional options are provided, for example, via an IVR menu, that take advantage of the coordination of calling services across multiple phone lines and devices (Step 310). For example, repeat dial could prompt the subscriber for alternative number(s) to be used to ring back the subscriber when the called party is reached. The call could then be completed by the system (Step 315).

Passive outgoing call services could also be enabled. For example, outgoing call blocking could prevent certain numbers from being called using this embodiment of the invention no matter where the calls are made from. This feature may be desired by parents who want their children to have access to the system to make important calls when they are away from home, but want to prevent their children from making long distance calls or calls to certain numbers using the system.

Optionally, while the call was in progress, the subscriber may also take advantage of certain incoming call services such as call waiting. For example, if the subscriber was making a call through the consolidated system from his mobile phone and a third party attempted to call the subscriber on his home phone, the consolidated system could notify the subscriber on his mobile phone of the call to his home phone. The subscriber could then pick up the incoming call to his home phone from his mobile phone.

The present invention may also take advantage of emerging protocols and technologies that merge the circuit-switched PSTN with the packet-switched IP network. For example, the ENUM protocol, which is described in the Internet Engineering Task Force's RFC 2916, matches every telephone number to a unique Internet address using Domain Name Service (DNS). Under this arrangement each telephone device may have a circuit-switched interface and a packet-switched interface which are both addressed using a single phone number. The present invention may utilize this for providing calling services across multiple telephone devices as well as for distributing calling service configuration changes.

The present invention is not limited to the specific embodiments described. It is expected that those skilled in the art will be able to devise other implementations that embody the principles of the present invention and remain within its scope.

What is claimed is:

1. A method for operating a database apparatus to maintain and update a configuration of calling services for a plurality of telephone devices belonging to a subscriber each associated with a network entity that provides the calling service for that telephone device, comprising:

receiving a request from the subscriber to configure a calling service;

determining the individual configuration changes that are required to fulfill the subscriber's request for each telephone device of the plurality of devices;

maintaining the database apparatus with the current configuration for the calling service;

updating the database apparatus with the individual configuration changes; and distributing the individual configuration changes for each telephone device from the database apparatus to the network entity that provides the calling service for that telephone device.

2. The method of claim 1 further comprising:

retrieving address information for the network entity that provides the calling service for each telephone device of the plurality of telephone devices from the database apparatus.

3. The method of claim 2 further comprising:

retrieving the current configuration for the calling service from the database apparatus.

4. The method of claim 3 wherein the request is received from the subscriber via an interactive voice response system.

5. The method of claim 3 wherein the request is received from the subscriber via the Internet.

6. The method of claim 2 wherein different network entities are responsible for the subscriber's telephone devices and wherein the step of distributing the individual configuration changes includes:

calling a network entity that provides the calling service for at least one of the telephone devices of the plurality of telephone devices; and providing the individual configuration changes on the database apparatus for the at least one of the telephone devices of the plurality of telephone devices to the network entity using dual tone multi frequency tones.

7. The method of claim 1 further comprising:
determining whether the individual configuration changes will result in logical inconsistencies in the operation of any of the calling services to which the subscriber is subscribed; and
denying the individual configuration changes when logical inconsistencies are determined to result.

8. The method of claim 1 wherein the calling service to be configured is selected from outgoing call blocking, call forwarding, incoming call blocking and priority ringing.

9. A method for operating a database apparatus to provide calling services to a subscriber having a plurality of telephone devices each associated with a network entity that provides the calling service for that telephone device, comprising:
receiving an incoming call directed to a telephone number;
identifying a first telephone device to which the telephone number is assigned;
identifying the subscriber to which the first telephone device belongs;
retrieving from a database apparatus calling service configuration information for a plurality of telephone devices belonging to the subscriber; and
based on the retrieved calling service configuration information for a second telephone device belonging to the subscriber, directing the incoming call.

10. The method of claim 9 further comprising:
directing the incoming call to a third telephone device.

11. The method of claim 9 further comprising:
directing the incoming call to the second telephone device and a third telephone device.

12. The method of claim 9 further comprising:
blocking the incoming call to the first telephone device based on a call blocking list associated with the second telephone device.

13. A method of operating a database apparatus to provide calling services to a subscriber having a plurality of telephone devices each associated with a network entity that provides the calling service for that telephone device, comprising:
receiving an indication from a particular telephone device that a subscriber wants to place a call;
identifying the subscriber;
retrieving calling service configuration information from the database apparatus for a plurality of telephone devices associated with the subscriber;
providing calling services to the subscriber based on the retrieved configuration information, such calling services involving a telephone device other than the particular telephone device from which the subscriber is placing the call.

14. The method of claim 13 wherein the step of identifying the subscriber includes:
identifying the subscriber based on the particular telephone device.

15. The method of claim 13 wherein the step of identifying the subscriber includes:
prompting the subscriber to provide authentication information;
receiving authentication information from the subscriber;
identifying the subscriber based on authentication information.

16. The method of claim 13 wherein the retrieved calling service configuration information includes one or more particular telephone numbers entered by a telephone device other than the particular telephone device from which the subscriber is placing the call and wherein the step of providing calling services comprises preventing calls from being placed to any of the one or more particular telephone numbers.

17. The method of claim 13 wherein the step of providing calling services includes:
providing the subscriber with calling options associated with the plurality of telephone devices assigned to the subscriber.

18. The method of claim 17 wherein the calling options include using a repeat dial service to ring back a telephone device other than the particular telephone device from which the subscriber is placing the call.

19. The method of claim 17 wherein the calling options include receiving an indication of an incoming call to a telephone device other than the particular telephone device from which the subscriber is placing the call.

* * * * *